United States Patent
Anzai et al.

(10) Patent No.: US 6,684,310 B2
(45) Date of Patent: Jan. 27, 2004

(54) ACCESS CONTROL METHOD AND STORAGE DEVICE USING SAME

(75) Inventors: Ichiro Anzai, Kawasaki (JP); Yoshiaki Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 09/759,699

(22) Filed: Jan. 12, 2001

(65) Prior Publication Data

US 2002/0016872 A1 Feb. 7, 2002

(30) Foreign Application Priority Data

Jul. 28, 2000 (JP) ........................................ 2000-229840

(51) Int. Cl.[7] ................................................. G06F 1/00
(52) U.S. Cl. ......................... 711/164; 710/36; 713/200
(58) Field of Search ................................ 711/117, 137, 711/152, 163–164; 713/200–203; 345/600; 710/36

(56) References Cited

U.S. PATENT DOCUMENTS

| | | | | |
|---|---|---|---|---|
| 4,703,422 A | * | 10/1987 | Kinoshita et al. | 711/117 |
| 5,586,301 A | * | 12/1996 | Fisherman et al. | 711/152 |
| 5,657,470 A | * | 8/1997 | Fisherman et al. | 711/153 |
| 5,805,699 A | * | 9/1998 | Akiyama et al. | 705/58 |
| 6,012,145 A | * | 1/2000 | Mathers et al. | 713/202 |
| 6,363,487 B1 | * | 3/2002 | Schneider | 713/200 |
| 6,415,359 B1 | * | 7/2002 | Kimura et al. | 711/137 |
| 6,523,094 B2 | * | 2/2003 | Kimura et al. | 711/137 |
| 6,526,441 B2 | * | 2/2003 | Yamaguchi et al. | 709/220 |

FOREIGN PATENT DOCUMENTS

| | | |
|---|---|---|
| JP | 08-249238 | 9/1996 |
| JP | 11-161552 | 6/1999 |
| JP | 2000-082257 | 3/2000 |

* cited by examiner

*Primary Examiner*—Christopher B. Shin
(74) *Attorney, Agent, or Firm*—Greer, Burns & Crain, Ltd.

(57) ABSTRACT

A storage device has access protection functions, enabling the resolution of problems occurring when, despite the fact that the actual access restriction state has changed, this change is not correctly transmitted to the host device (information processing device). The access control method of a storage device performs driving at least for reading of storage media by means of a host device control system, in which said control system is notified of the replacement of said storage media when the access permission state of said storage media has changed, without the physical removal of said storage media from said storage device.

10 Claims, 8 Drawing Sheets

ACCESS CONTROL METHOD AND STORAGE DEVICE USING SAME

BACKGROUND OF THE INVENTION

1. Field of the Invention

This invention concerns a storage device connected to a host device in which is stored an operating system, and which is connected to and used with a computer, word processor, electronic book, or other information processing device. In particular, this invention concerns a storage device having access protection functions to permit or prohibit writing to or reading from storage media.

2. Description of the Related Art

A storage device connected to the above-mentioned information processing devices may be written with information pertaining to privacy, confidential information concerned with employee duties, or other information which should not be known to persons other than managers or the original owners of the data.

For this reason, hard disk devices, magneto-optical disk devices and the like have a mechanism to perform access restriction (permission) using passwords or other means.

In such a device, the storage media and storage device may for example have a password, and when a password sent from the host device (here corresponding to an information processing device to which an external storage device is connected) does not coincide with this, reading and writing are prohibited.

In a computer or other information processing device using an external storage device, in order to efficiently perform data access of the external storage device, data and directory information on the storage media is buffered in the main storage device (internal storage device).

For example, even if a request to write to the external storage device occurs, it is not executed immediately, but the write data is stored temporarily in the buffer of the main storage device. When a suitable amount of data has accumulated, writing to the external storage device is executed.

Or, directory information for the storage device is read into the main storage device in advance. In response to requests from an application or similar, data updates are performed for data in the buffer. At an appropriate time, processing is performed to write back the buffer data to the storage media.

In such processing, until the storage media is removed from the storage device, the directory information may remain buffered.

Further, in order for an information processing device which uses an external storage device to recognize that the storage media in the external storage device has been replaced, when writing to the storage media is permitted, part of the OS (operating system) may periodically write prescribed data to the storage media.

It is assumed that, in the above-mentioned information processing device, until the storage media is actually removed or is replaced, the state of access restriction for the storage media (reading and writing permitted or prohibited) does not change.

Consequently, in a state in which storage media is used employing a storage device such as described above, when the state of access restrictions (writing permitted or prohibited) changes, a problem may arise.

For example, in an information processing device, when directory and other information is buffered, even if the access restriction state for the storage media is set to permit reading, reading becomes impossible, and even if no data is read from the storage device, directory information stored in the main storage device of the information processing device is displayed.

In this case, even if directory information is displayed, the functions of the storage device are not utilized. Further, in this stage the application software continues its task, so that data may be lost, or inconsistent data may be created.

In the information processing device, in order to check for removal or replacement of the storage media, when the access restriction state is a write-permitted state, and data is periodically written to a certain part, the following problem exists.

Namely, when the access restriction state changes from write-permitted to write-prohibited, this change cannot be detected by the information processing device. Consequently an attempt is made to execute writing at the next timing cycle. In this case, [the access restriction] is set to write-prohibited on the storage device side, so that an error is returned to the OS, and a write error occurs.

On the information processing device side, this error is not expected, so that satisfactory error processing is not performed, and as a result, system stoppage may occur.

SUMMARY OF THE INVENTION

Hence an object of this invention is to provide a storage device which resolves this problem of the prior art.

In particular, an object of this invention is to provide a storage device having access protection functions which resolves problems which occur when the actual access permission state in the storage device changes, but this [change] is not correctly transmitted to the host device (the information processing device).

As the basic concept of the access control method in a storage device to achieve the above object of this invention, the method is an access control method of a storage device which performs driving at least for reading of storage media by means of the host device control system, characterized in that, when the state of access permission for the above-mentioned storage media changes without the physical removal of the above-mentioned storage media from the above-mentioned storage device, this change is detected, and the above-mentioned control system is notified that the above-mentioned storage media has been replaced.

A preferred embodiment of the above-mentioned access control method to achieve the objects of the invention is characterized by changes in the above-mentioned access permission state being based on the issue of commands to the above-mentioned storage device by means of a user trigger.

A preferred embodiment of the above-mentioned access control method to achieve the objects of the invention is the access control method of a storage device which performs driving at least for reading of storage media by means of the host device control system, characterized by the reception of prescribed commands from the above-mentioned control system, and by notification of the above-mentioned control system of replacement of the storage media without depending on changes in the state of access permission of the above-mentioned storage media when the next access command is received through the above-mentioned control system.

A preferred embodiment of the above-mentioned access control method to achieve the objects of the invention is characterized by the above-mentioned prescribed commands being commands to change the logic format.

A preferred embodiment of the above-mentioned access control method to achieve the objects of the invention is characterized by changes in the state of access permission of the above-mentioned storage media being performed through the receipt of commands from the access restriction control system.

A preferred embodiment of the above-mentioned access control method to achieve the objects of the invention is characterized by notification of the above-mentioned host device of replacement of the above-mentioned storage media when a password stipulating the access restriction state, sent from the above-mentioned host device, is received.

A storage device which attains the above-mentioned objects of the invention is a storage device with basic configuration such that driving is performed for at least reading of storage media by means of the control system of a host device, and which is characterized by having a storage unit which stores passwords which stipulate the state of restriction of access to the storage media of the above-mentioned storage device; a reception unit which receives commands from the above-mentioned host device; a permission control unit which compares a password received from the above-mentioned host device and a password stored by the above-mentioned storage unit, and, in case of coincidence, permits a change of the access restriction state; and a notification unit which notifies the above-mentioned host device of replacement of the above-mentioned storage media based on changes in the above-mentioned access restriction state.

A preferred embodiment of the above-mentioned storage device to attain the objects of this invention is a storage device which performs driving for at least reading of storage media by means of the control system of a host device, characterized by having a detection unit which detects changes when the access permission state for the above-mentioned storage media changes without the physical removal of the storage media when an access command for the above-mentioned storage media is received from the above-mentioned control system, and a notification unit which notifies the above-mentioned host device when the above-mentioned storage media is replaced.

A preferred embodiment of the above-mentioned storage device to attain the objects of this invention is a storage device which performs driving for at least reading of storage media by means of the control system of a host device, having a reception unit which receives commands from the above-mentioned host device, and a notification unit which, when an access command is next sent via the above-mentioned control system after receiving an access command for the above-mentioned storage media from the above-mentioned control system, notifies the above-mentioned control system of the replacement of storage media, regardless of changes in the state of access permission for the above-mentioned storage media.

A preferred embodiment of the above-mentioned storage device to attain the objects of this invention is a storage device which performs driving for at least reading of storage media by means of the control system of a host device, having a reception unit which receives commands from the above-mentioned host device, and a notification unit which, when a command is next received via the above-mentioned control system after the above-mentioned reception unit receives a prescribed command from the above-mentioned control system to change the logical format of the above-mentioned storage media, notifies the above-mentioned control system of the replacement of the above-mentioned storage media.

The features of this invention will be made clearer by embodiments of the invention, which are explained below with reference to the drawings.

DESCRIPTION OF THE PREFERRED EMBODIMENTS

Figure 1:
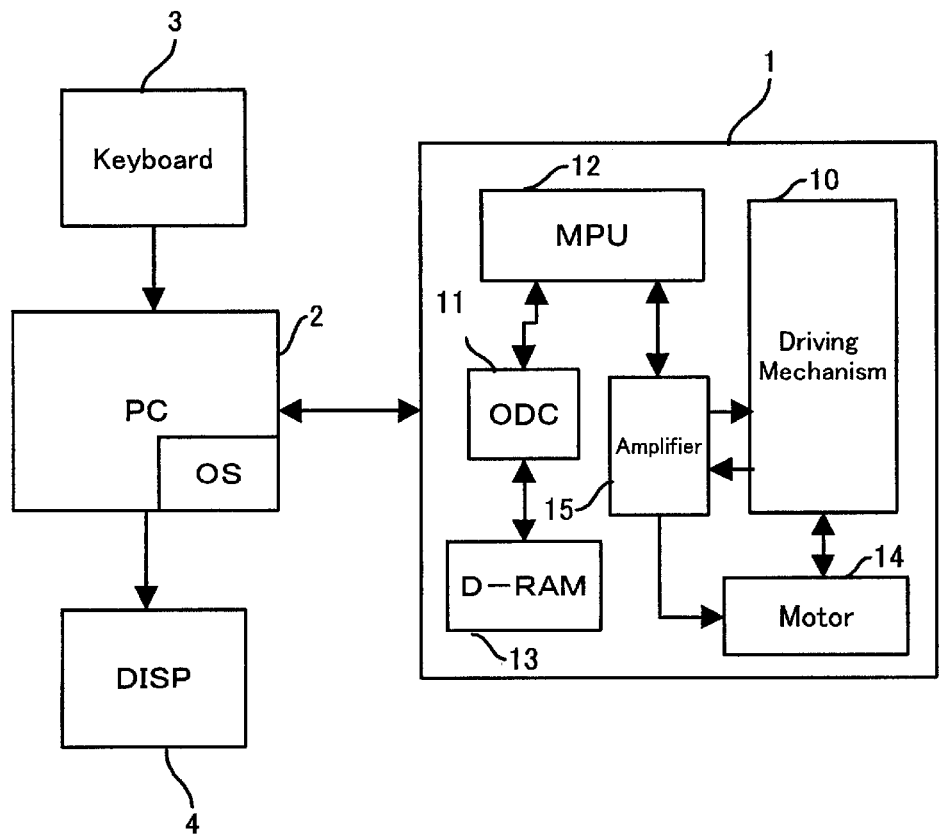
FIG. 1 is a drawing showing one embodiment of a storage device to which this invention is applied, and one aspect in which an information processing device is connected as a host device.

Below, aspects of embodiments of this invention are explained with reference to the drawings. The aspects of embodiments shown in the drawings are for the purpose of explanation of this invention, and do not limit the scope of protection of this invention.

FIG. 1 is a drawing showing one embodiment of a storage device to which this invention is applied, and one aspect in which an information processing device is connected as a host device.

In FIG. 1, the magneto-optical disk device 1, as an example of a storage device, and using magneto-optical disks as storage media, is connected as an external storage device to the personal computer 2, which is an information processing device, as the host device.

The personal computer 2 has an operating system (OS) as a control system. To the personal computer 2 are connected a keyboard 3, as an input device, and a display 4, as an output device.

The magneto-optical disk device 1 comprises a driving mechanism control unit 10 driving a head which writes and reads magneto-optical disks as storage media, and a control circuit unit which includes an optical disk control device 11.

The control circuit unit has an MPU 12 which executes overall control of the magneto-optical disk device 1, a DRAM 13 which is a buffer memory for read/write data and memory to which various programs and tables are expanded, a disk rotation motor control circuit 14, amplifier 15, and other components.

Figure 2:
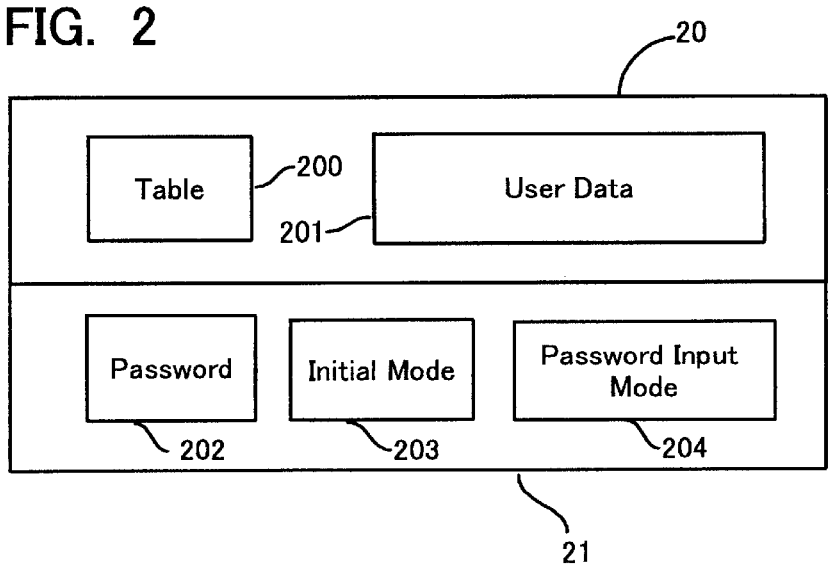
FIG. 2 is a diagram which explains the data region of the storage media with protect functions applied in this invention.

FIG. 2 is a diagram which explains the data region of the storage media with protect functions applied in this invention. The configuration of this data region is expanded in memory as media information by the above-mentioned programs when the media is inserted.

The storage media is divided into a user area 20, and an area 21 which is indispensable for access by users using normal methods. When there are no access restrictions, the user area 20 can be accessed by ordinary methods; the contents of the table 200 of user area 20 are referenced to enable read/write access of the user data 201.

The password 202, initial mode 203, password input mode 204, and other information is stored in the area 21 which cannot be accessed by the user.

The initial mode 203 includes access restriction information for the user area 20 when the storage media is inserted into the magneto-optical disk device 1. Specifically, the access restriction information defines three kinds of states, a read/write enabled state, a read-enabled state (write disabled), and an access-disabled state.

The password input mode 204 shows the attributes of the storage media when a password is sent from the host device 2 by a special command, and this coincides with a password 202 stored in advance. Specifically, similarly to the above case, there are three kinds of states, a read/write enabled state, a read-enabled state (write disabled), and an access-disabled state.

Below the operation of access protection functions in a storage device according to this invention, having the above configuration, is explained.

Figure 3:
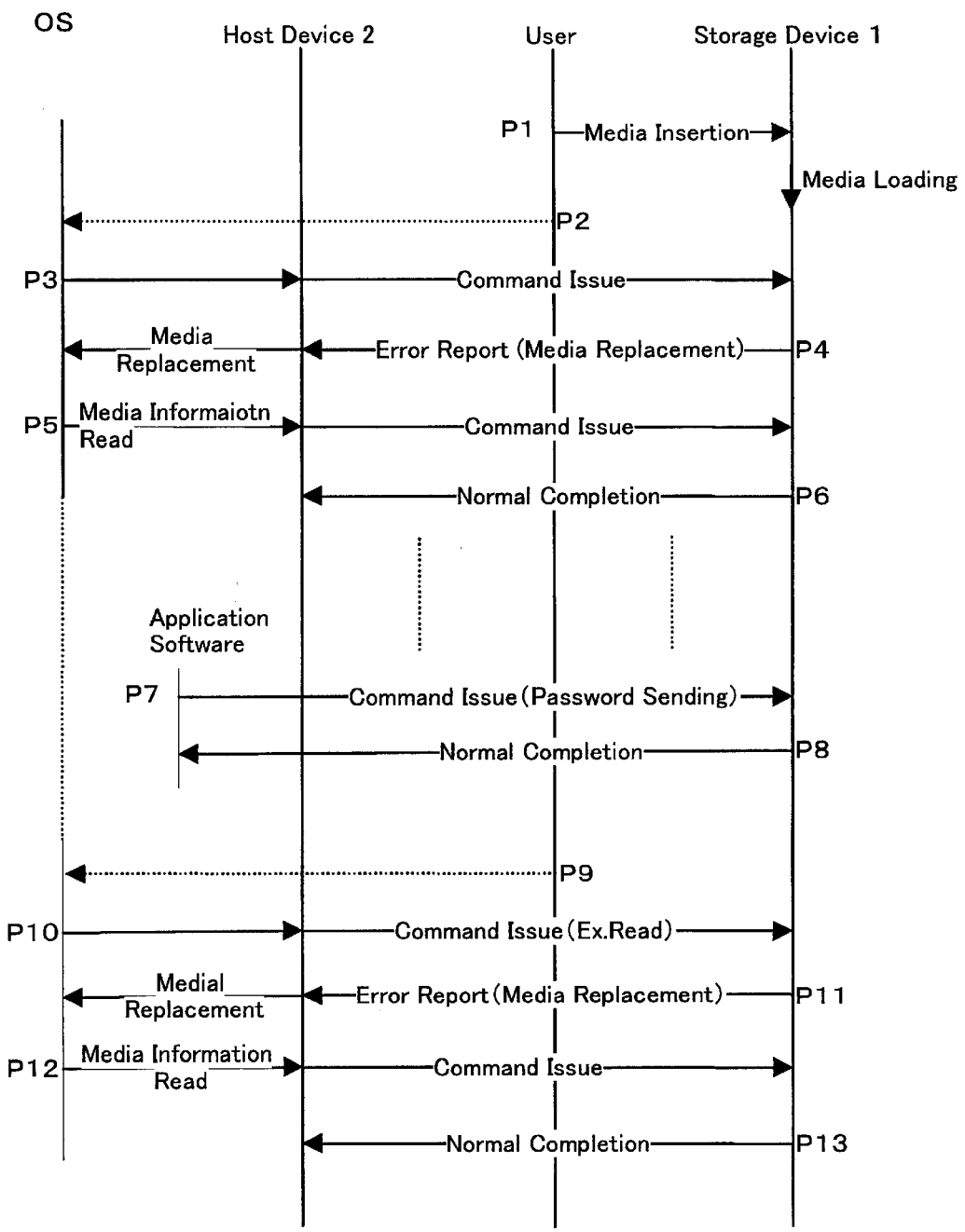
FIG. 3 shows a sequence flow which explains in summary the access protection functions according to this invention.

FIG. 3 shows a sequence flow which explains in summary the access protection functions according to this invention. In order to expedite understanding of the invention, this is explained in advance of an explanation of the operation of the embodiment.

In FIG. 3, when storage media is inserted into the storage device 1 by the user (processing step P1), the storage device 1 loads the media and reads the access permission state of the storage media, and stores this in the RAM of the storage device 1.

Next, the user inputs a trigger signal to the OS, by pressing the keyboard or by some other means (processing step P2). At this time, the OS sends a command signal to the storage device 1 via a SCSI adapter of the host device 2 or other host interface (processing step P3).

In response to this command signal, the storage device 1 notifies the OS, via the host interface of the host device 2, of storage media replacement information, that is, of access permission states previously read from the storage media, by means of error reports (processing step P4).

By this means, the OS can learn of the access enabled state of the inserted media.

In this state, the OS sends commands to the host interface of the host device 2 in order to read the FAT (file allocation table), security information, and other media information. By this means, the host device 2 sends the corresponding commands to the storage device 1 (processing step P5). At this time, the storage media is loaded into the storage device 1, so that FAT reading is possible, and the storage device 1 notifies the host device 2 of normal completion (processing step P6).

By this means, the OS can, by accessing the storage device 1, learn of the access restriction state at the time the media is inserted.

In such a state, it is possible for the user to overwrite the contents stored in the above-mentioned RAM within the storage device 1 by means of an application program as an access restriction control system; that is, it is possible to change the access restriction state of the storage media, and induce a state as though the media were physically removed temporarily from the storage device 1 and different media were reinserted.

That is, a password to change the state recorded in RAM for the inserted storage media, for example, a password to change from a read/write enabled state to a read-only state, is sent by the application program to the storage device 1 (processing step P7).

By this means the state of the storage media is changed, and the application software (the user) is notified of normal completion (processing step P8).

In this state, when there is for example a read trigger from the user (processing step P9), a read command is issued to the storage device 1 from the OS side, via the host interface of the host device 2 (processing step P10). The storage device 1 has been put by the application software into a state of replaced media in the previous processing steps P7 and P8.

Hence the state change is reported as an error by the storage device 1 (processing step P11). By this means, it can be recognized on the OS side that the media has been replaced.

In this way, notification of replaced media on the side of the host device 2 is performed in order to discard the cache data for directory information and disk allocation information, and information concerning the disk, such as whether read-only, content, logical format and other information, which had been saved until then by the host device 2, and in order to obtain new media information.

Further, in this invention, when the next command is sent to the storage device 1 from the host device 2 (processing step P12), regardless of whether there is a change in the access restriction state, there may be notification that the storage media has been replaced (processing step P13). This is the case in which the logical format of the storage media has been changed by a prescribed command.

In this case, when the next command occurs via the OS (processing step P12), notification is sent that the storage media has been replaced (processing step P13).

By this means, when the logical format structure is changed for security or other purposes, but not the access state, the change in media state is notified (processing step P13) simply when the next command arrives via the OS (processing step P12).

Similarly to the above, this also is in order to discard the disk logical format information saved till then by the host device 2, and to obtain new media logical format information.

Figure 4:
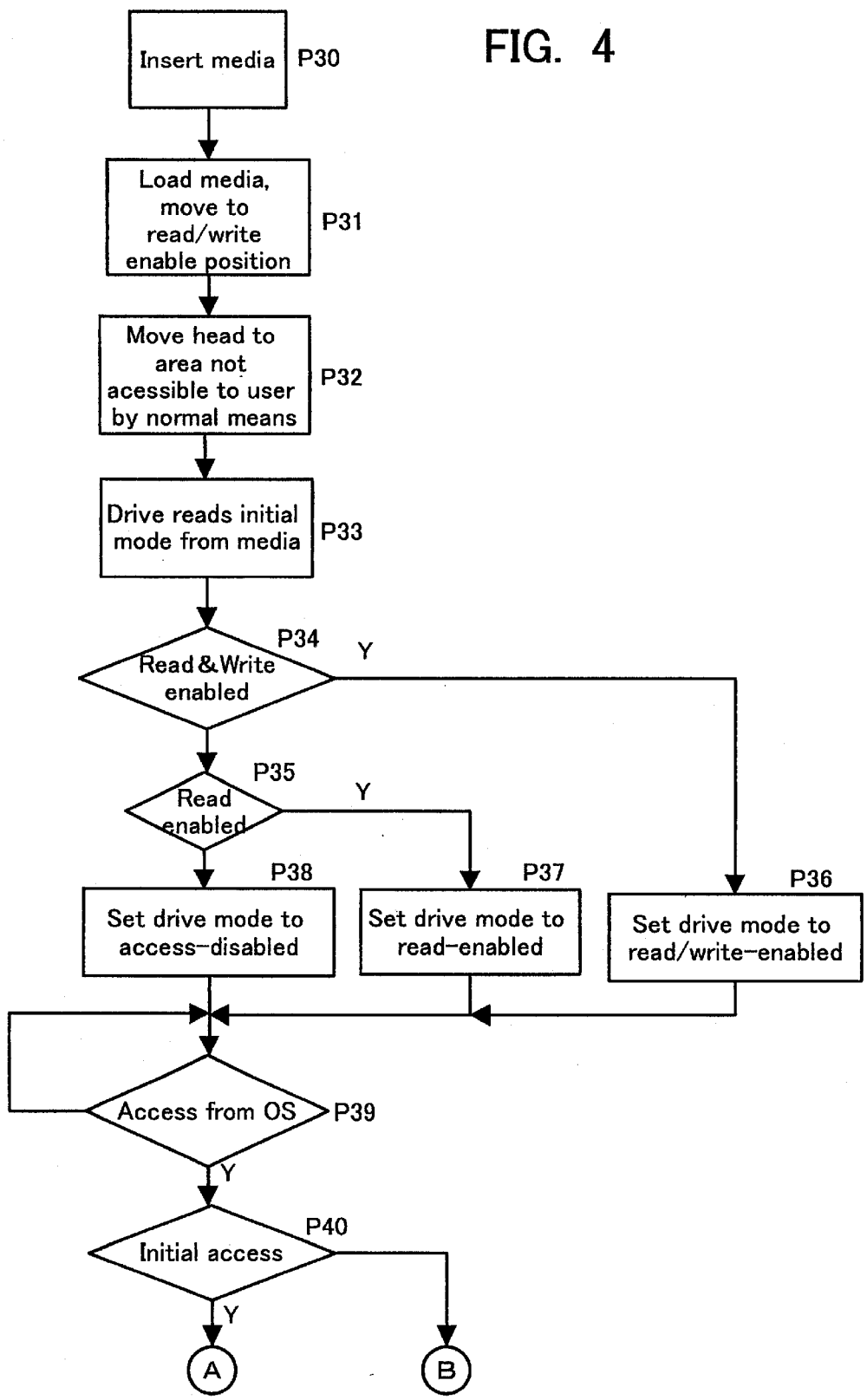
FIG. 4 is a drawing showing the flow of operation (first part) of an embodiment of the access protection functions.
Figure 5:
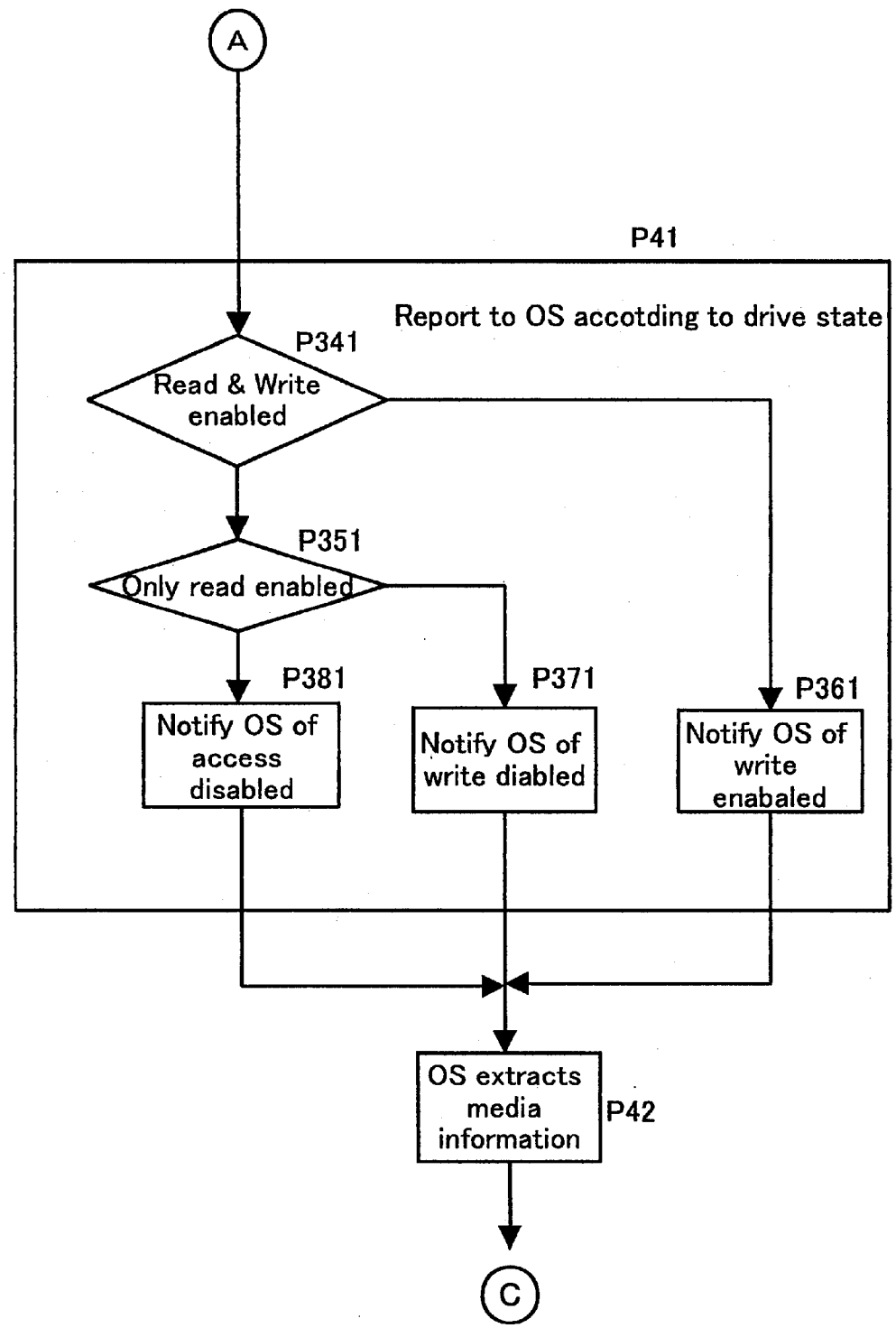
FIG. 5 is a drawing showing the flow of operation (second part) of an embodiment of the access protection functions.
Figure 6:
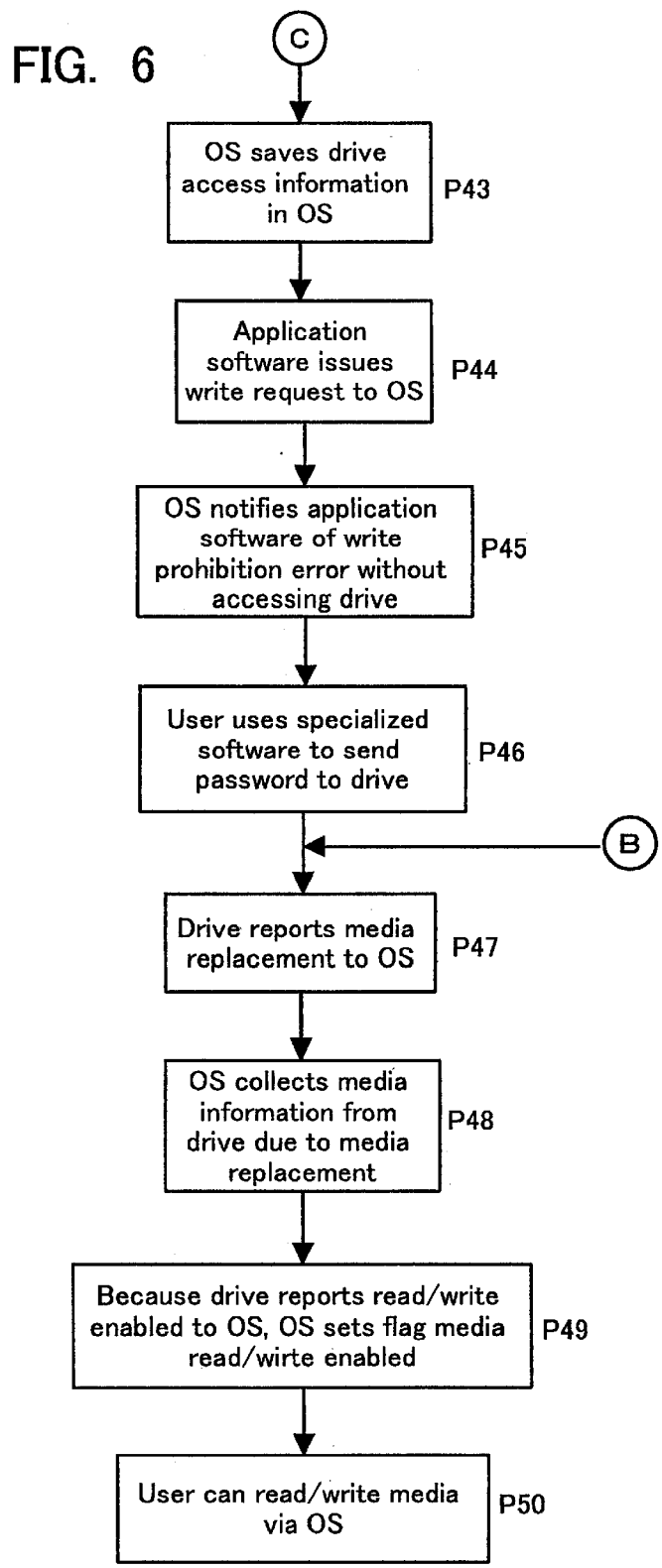
FIG. 6 is a drawing showing the flow of operation (third part) of an embodiment of the access protection functions.

FIGS. 4 through 6 are drawings showing the flow of operation of an embodiment of the access protection functions corresponding to the sequence flow of the above-mentioned FIG. 3. This operation flow is executed and controlled by firmware under the control of the MPU 12 by instructions from the magneto-optical disk control device 11 of FIG. 1.

In the configuration of the magneto-optical disk device 1 in the embodiment of FIG. 1, the magneto-optical disk control device 11 and the MPU 12 and other components are shown in separate blocks; but it is possible to configure these on the same chip.

In FIG. 4, when storage media is inserted into the magneto-optical disk device 1 (processing step P30), the driving mechanism 10 performs the load operation, and the head is moved to a position at which media reading and writing are possible (processing step P31).

Further, the head is moved to the area 21 (cf. FIG. 2) which the user cannot access by normal methods (processing step P32). The magneto-optical disk device 1 read the initial mode 203 of the area 21 of the storage media (processing step P33).

From the initial mode 203 which has been read, the processing steps P34 and P35 judge one of three settings. These three setting modes are: "set drive mode to read/write-enabled," "set drive mode to read-enabled," and "Set drive mode to access-disabled."

Of these three setting modes, the processing 36, 37 or 38 corresponding to the mode stored as the initial mode 203 is set in the D-RAM 13 of the magneto-optical disk device 1.

Next, the magneto-optical disk device 1 awaits access from the OS of the host device 1 (processing step P39). Either the magneto-optical disk control device 11 or the MPU 12 comprises a command monitor unit, and a judgment is made as to whether the access is the initial access. If it is the initial access (processing step P40, Yes), a drive state is assumed; that is, the following content is reported to the OS according to the content of the initial mode 203 (processing step P41).

In the above processing step P41, similarly to the processing steps P34 through P38, depending on which of the above explained, three drive states exists, the OS is notified of the corresponding state (processing steps P361, P371, P381).

By this means the OS can extract access information from the media (processing step P42).

Here access from the OS is performed by sending to the magneto-optical disk device 1 a SCSI command via a SCSI bus.

As the response to this SCSI command, the magneto-optical disk device 1 applies to the OS a "unit attention" state notification. By means of this state notification, one of the three media access information items, processing step P361, P371 or P381, is sent to the OS.

When, in the above judgment processing step P40, the access is not the initial access, when a command is again sent from the OS, a "unit attention" is sent from the magneto-optical disk device 1, as explained below. The details are explained in FIG. 6.

In this way, access information for the storage media obtained on the OS side is saved within the OS (processing step P43).

The following explanation assumes that the storage media access state saved in the OS enables reading of the storage media, but that writing is disabled.

In cases where a request to write to the storage media is sent from the application software to the OS (processing step P44), the OS already recognizes that the storage media is write-disabled, and so no access is performed of the drive, that is, the magneto-optical disk device 1, and the application software side is notified of a write prohibit error (processing step P45).

Assume a case in which, in this state, the storage media access state changes.

As an example, consider a case in which access restrictions are performed by means of passwords. The user employs specialized software to send a password to the magneto-optical disk device 1 (processing step P46). At the magneto-optical disk device 1, the received password is compared with a password 202 on the storage media (cf. FIG. 2).

When the result of this comparison is coincidence, the storage media is changed to read/write-enabled. However, the OS still recognizes the media as read-only.

Figure 7:
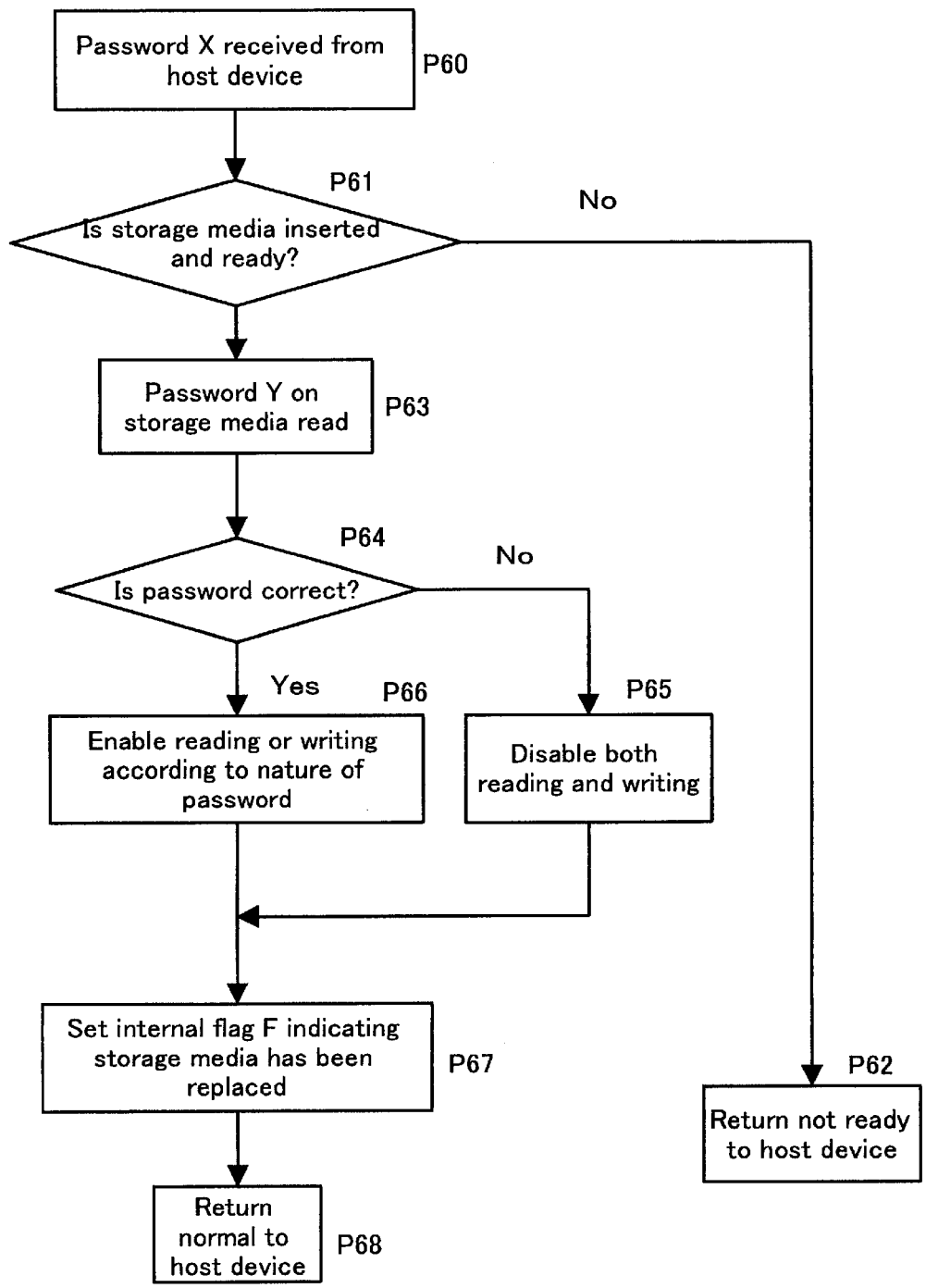
FIG. 7 is a drawing showing the flow of operation of an embodiment which explains in detail the processing step P46 in FIG. 6.

FIG. 7 is a drawing showing the flow of operation of an embodiment which explains in detail the processing step P46. This is the processing flow when a password X is sent from the host device 2 to the magneto-optical disk device 1 in order to obtain permission to access the storage media.

The password X is received (processing step P60), and if at this time the storage media is not inserted, there is no storage media physically present, and a "not ready" message is returned to the host device (processing step P62).

If the storage media is inserted, preparations for processing are completed, and so the password Y on the storage media (cf. 202 in FIG. 2) is read (processing step P63). These passwords X and Y are then compared (processing step P64). If they do not coincide, the access is illicit, and so the mode on password input 204 (cf. FIG. 2) is set to "read-disabled, write-disabled" (processing step P65).

If the compared passwords coincide, reading or writing is enabled corresponding to the nature of the password, and the mode on password input 204 is set.

Next, a flag F indicating that the storage media has been replaced is set in the D-RAM 13 (processing step P67), and information indicating either normal completion as the result, or an access restriction state or other information, is returned to the host device 2 (processing step P68).

Figure 8:
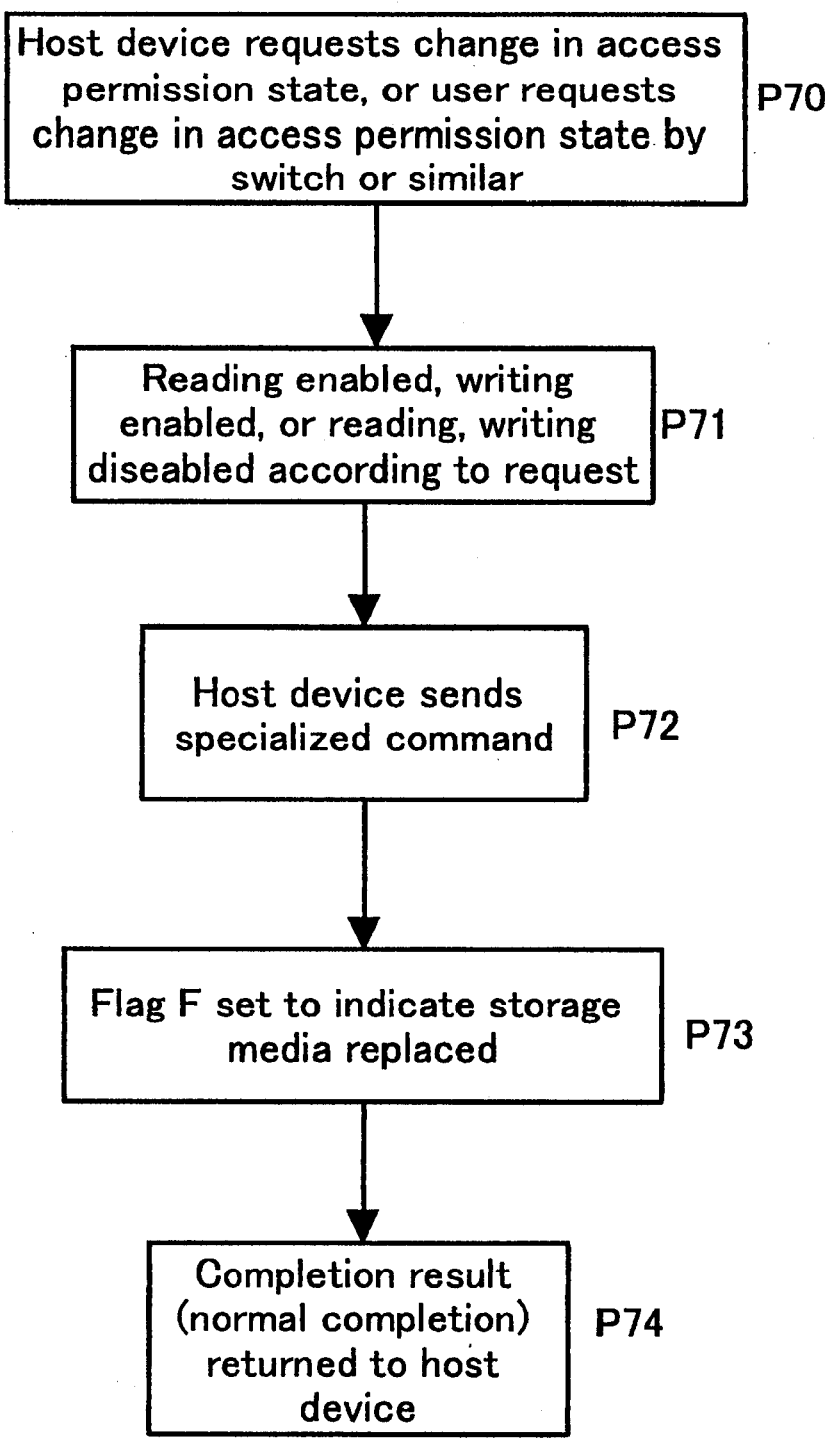
FIG. 8 is a drawing showing the flow of operation of an embodiment of another method for changing access permission using a password in FIG. 7; and, FIG. 9 is a drawing showing the flow of operation when, in a state in which reading and writing of the storage media are enabled via the OS, the storage media is accessed from the host device 2.

FIG. 8 shows the flow of operation of an embodiment of another method for changing access permission using a password as in FIG. 7.

For example, assume a device wherein a switch exists in the housing of the magneto-optical disk device 1, by which means the user can specify the access restriction state (write-enabled, -disabled, etc.). In this case, the user operates the switch, which is detected by the magneto-optical disk device 1, and a change in the access restriction state is requested (processing step P70).

This processing step P70 also includes cases in which the host device 2 requests some means of changing the access restriction state.

Reading is enabled or disabled according to the request (processing step P71). Next, the host device 2 sends a specialized command (processing step P72).

A flag indicating that the storage media has been replaced is set in D-RAM 13 (processing step P73).

Next, information indicating either normal completion as the result, or an access restriction state or other information, is returned to the host device 2 (processing step P74).

Returning to the processing flow of FIG. 6, processing steps P47 and beyond are explained. The flag F is set, resulting in a state equivalent to the state in which the storage media is replaced, so that the magneto-optical disk device 1 reports to the OS that the storage media has been replaced, although in actuality the media has not been replaced (processing step P47). This is performed by means of the "unit attention" described above.

According to the OS, the storage media has been replaced, and so a data access command is sent to the magneto-optical disk device 1, and media information is collected from the magneto-optical disk device 1 (processing step P48).

As the response to this, the magneto-optical disk device 1 reports to the OS that reading and writing are enabled (processing step P49). By this means, the OS also sets a flag enabling reading and writing of the storage media.

By this means, the user can read and write the storage media via the OS (processing step P50).

Figure 9:
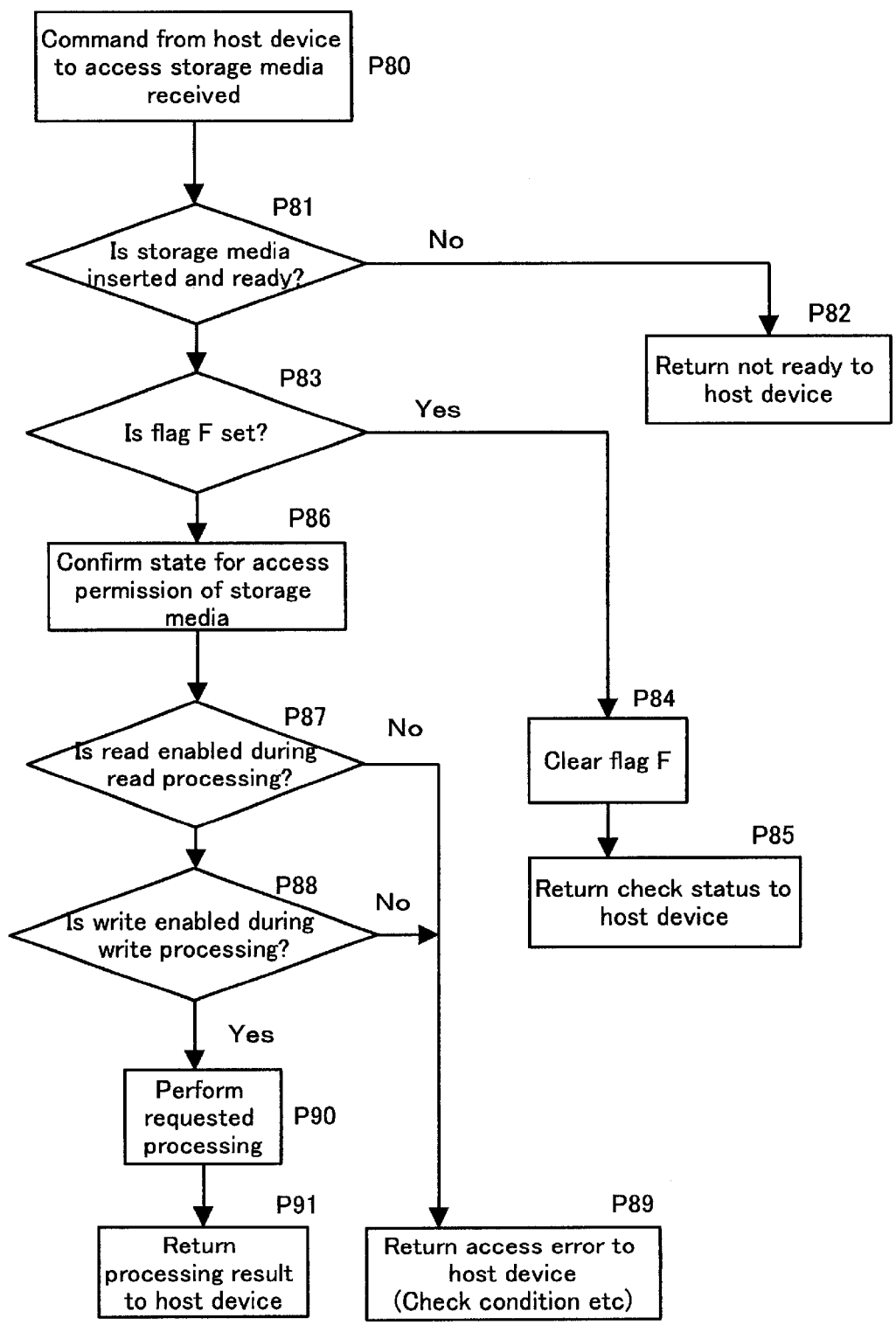

FIG. 9 is a drawing showing the flow of operation when, in a state in which reading and writing of the storage media are enabled via the OS, the storage media is accessed from the host device 2.

When the command to access the storage media is received from the host device 2 (processing step P80), the storage device 1 decides whether the storage media is inserted (processing step P81).

If the storage media is not inserted, a "not ready," indicating that the storage media is not physically present, is returned to the host device 2 (processing step P82).

If the storage media exists, a decision is made as to whether the flag F is set (processing step P83).

If the flag F is set, from the flow of FIG. 6, this signifies that the storage media has been replaced. Hence the flag F is cleared (processing step P84), and a "check status" notifying of an error is returned to the host device (processing step P85). In the judgment processing P83, if the flag F is set, a state of restricted access to the storage media is confirmed (processing step P86).

In the judgment processes P87, P88, if it is judged that access is disabled (branching to No in either of the judgment processes P87 or P88), an access error is returned to the host device 2 (processing step P89).

On the other hand, if in judgement process steps P87 and P88, processing requested for access restriction states are sought, the requested processing is performed (processing step P90). The processing result is returned to the host device 2, and processing is concluded (processing step P91).

The above embodiment aspects have been explained primarily taking magneto-optical disk device as an example of a storage device, but the present invention is not limited to these examples of course application to floppy disk devices, DVDs and to storage devices using other removable disk media is also possible.

As has been explained in the above embodiments, by means of this invention, the OS can be notified of changes in the state of storage media without requiring that a method peculiar to the OS be used, and without actually inserting storage media into or removing storage media from the storage device.

Hence despite the fact that the actual access permission state has changed in a storage device of this invention, the problem of the system stopping because this change is not correctly transmitted to the host device (information processing device) can be avoided.

What is claimed is:

1. An access control method of for a storage device which performs driving at least for reading of storage media by a host device control system, comprising the steps of:
   detecting that a state of access permission for the storage media changes without physical removal of said storage media from the storage device; and
   notifying the host device control system, as if the storage media has been replaced with other storage media.

2. The access control method for a storage device according to claim 1, wherein said change in said state of access permission is based on issue of a command to said storage device by a user trigger.

3. The access control method for a storage device according to claim 2, wherein said change in the said state of access permission of said storage media is performed through receipt of a command from an access restriction control system.

4. An access control method for a storage device which performs driving at least for reading of storage media by the host device control system, comprising the steps of:
   receiving a prescribed command from the host device control system; and
   when an access command is received via said host device control system, notifying as if the storage media has been replaced, regardless of a change in a state of permission to access said storage media.

5. The access control method for a storage device according to claim 4, wherein said prescribed command is a command to change a logic format.

6. The access control method for a storage device according to claim 1, wherein said storage device notifies the host device control system, as if the storage media has been replaced with other storage media, when a password, which stipulates an access permission state is sent from said host device control system.

7. A storage device which performs driving for at least reading of storage media by a host device control system, comprising:
   a storage unit storing a password which stipulates a state of restriction of access to the storage media of said storage device;
   a reception unit receiving a command from said host device control system;
   a permission control unit comparing a password received from said host device control system and a password stored by said storage unit, and, in case of coincidence, permitting a change of the access restriction state; and
   a notification unit notifying said host device control system as if said storage media has been replaced with other storage media based on changes in said access restriction state.

8. A storage device which performs driving for at least reading of storage media by a host device control system, comprising:
   a detection unit detecting changes when an access permission state for said storage media changes without physical removal of the storage media when an access command for said storage media is received from said host device control system; and
   a notification unit notifying said host device control system as if said storage media has been replaced with other storage media.

9. A storage device which performs driving for at least reading of storage media by host device control system, comprising:
   a reception unit receiving a command from said host device control system; and
   a notification unit notifying, when an access command is next sent via said host device control system after receiving an access command for said storage media from said host device control system, said host device control system as if the storage media has been replaced with other storage media, regardless of changes in a state of access permission for said storage media.

10. A storage device which performs driving for at least reading of storage media by host device control system, comprising:
   a reception unit receiving a command from said host device control system; and
   a notification unit notifying, when a command is next received via said host device control system after said reception unit receives a prescribed command from said host device control system to change a logical format of said storage media, said host device control system as if said storage media has been replaced with other storage media.

* * * * *

UNITED STATES PATENT AND TRADEMARK OFFICE
CERTIFICATE OF CORRECTION

PATENT NO. : 6,684,310 B2
DATED : January 27, 2004
INVENTOR(S) : Anzai et al.

It is certified that error appears in the above-identified patent and that said Letters Patent is hereby corrected as shown below:

Column 9,
Line 44, delete "of".
Line 57, delete "the".

Column 10,
Lines 42 and 55, between "by" and "host", insert -- a --.

Signed and Sealed this

Sixth Day of July, 2004

JON W. DUDAS
*Acting Director of the United States Patent and Trademark Office*